United States Patent
Luongo

(10) Patent No.: US 11,741,386 B2
(45) Date of Patent: *Aug. 29, 2023

(54) METHOD OF BLOCKING OR PASSING MESSAGES SENT VIA A FIREWALL BASED ON PARSING OF SYMBOLS STRINGS CONTAINED IN MESSAGES AMONG DIFFERENT KEYWORDS

(71) Applicant: BULL SAS, Les Clayes-sous-Bois (FR)

(72) Inventor: Alessandro Luongo, Bezons (FR)

(73) Assignee: BULL SAS, Les Clayes-sous-Bois (FR)

( * ) Notice: Subject to any disclaimer, the term of this patent is extended or adjusted under 35 U.S.C. 154(b) by 739 days.

This patent is subject to a terminal disclaimer.

(21) Appl. No.: 16/728,134

(22) Filed: Dec. 27, 2019

(65) Prior Publication Data
US 2020/0213276 A1 Jul. 2, 2020

(30) Foreign Application Priority Data
Dec. 27, 2018 (EP) .................................... 18306860

(51) Int. Cl.
*G06N 10/00* (2022.01)
*G06F 17/16* (2006.01)
(Continued)

(52) U.S. Cl.
CPC ............. *G06N 10/00* (2019.01); *G06F 17/16* (2013.01); *G06F 18/213* (2023.01);
(Continued)

(58) Field of Classification Search
CPC ... G06N 10/00; G06F 18/2155; G06F 18/213; G06F 17/16; H04L 63/0209; H04L 63/0227
See application file for complete search history.

(56) References Cited

U.S. PATENT DOCUMENTS 11,580,195 B1 * 2/2023 Batruni ................... G06F 17/16
2008/0137969 A1 * 6/2008 Rueckert .............. G06K 9/6234
382/224
(Continued)

OTHER PUBLICATIONS

Search Report issued by the European Patent Office for EP18306860 with search date of Jun. 26, 2019.
(Continued)

*Primary Examiner* — Khai M Nguyen
(74) *Attorney, Agent, or Firm* — Meagher Emanuel Laks Goldberg & Liao, LLP

(57) ABSTRACT

This invention relates to a method of blocking or passing messages sent via a firewall, based on parsing, of symbols strings contained in said messages, among different keywords, assigning to said messages either a blocking class or a passing class, comprising: performing a dimensionality reduction step for said different classes on a training set of messages whose classes are known, and then classifying one or more unknown messages among said different classes with reduced dimensionality, said dimensionality reduction step being performed on said training set of messages by machine learning including processing, for several first matrices and for several second matrices, a parameter representative of a product of two first and second matrices to assess to which given class a given message belongs: first matrix representing a first array of keywords versus symbols strings contained in a first given message, second matrix representing the values of differences between said first array and a second array of keywords versus symbols strings contained in a second given message different from first given message but known to belong to same class as first given message, wherein: a quantum singular value estimation is performed on first matrix, a quantum singular value estimation is performed on second matrix, both quantum singular value estimation of first matrix and quantum sin- (Continued)

gular value estimation of second matrix are combined together, via quantum calculation, so as to get at a quantum singular value estimation of said product of both first and second matrices, said quantum singular value estimation of said product of both first and second matrices being said parameter representative of said product of two first and second matrices processed to assess to which given class said first given message belongs.

14 Claims, 2 Drawing Sheets

(51) Int. Cl.
  *H04L 9/40* (2022.01)
  *G06F 18/213* (2023.01)
  *G06F 18/214* (2023.01)
(52) U.S. Cl.
  CPC ...... *G06F 18/2155* (2023.01); *H04L 63/0209* (2013.01); *H04L 63/0227* (2013.01)

(56) References Cited

U.S. PATENT DOCUMENTS

| | | | | |
|---|---|---|---|---|
| 2015/0154147 A1* | 6/2015 | Alboszta | ................ | G06N 10/00 702/179 |
| 2020/0210755 A1* | 7/2020 | Luongo | ................ | G06K 9/6232 |
| 2020/0218776 A1* | 7/2020 | Shah | ........................ | G06F 17/18 |
| 2021/0352087 A1* | 11/2021 | Ryver | .................... | G06N 10/00 |

OTHER PUBLICATIONS

Kerenidis, I., Luongo, A., 'Quantum classification of the MNIST dataset via Slow Feature Analysis', 2018, pp. 1-25, XP055598184, arXiv:1805.088372v2 [quant-ph].

Sahoo, D., Liu, C., Hoi, S.C.H., 'Malicious URL Detection using Machine Learning: A Survey', 2017, pp. 1-21, XP055599492, arXiv:1701.07179v2 [cs.LG].

Cornelissen, A.J., 'Quantum gradient estimation and its application to quantum reinforcement learning', 2018, Master thesis, Delft University of Technology, pp. 1-173, XP055598594.

Hoang, X.D., Nguyen, Q.C., 'Botnet Detection Based On Machine Learning Techniques Using DNS Query Data', 2018, Future Internet, vol. 10, No. 5, pp. 1-11, XP055599395, DOI:10.3390/fi10050043.

* cited by examiner

METHOD OF BLOCKING OR PASSING MESSAGES SENT VIA A FIREWALL BASED ON PARSING OF SYMBOLS STRINGS CONTAINED IN MESSAGES AMONG DIFFERENT KEYWORDS

FIELD OF THE INVENTION

The invention relates to methods of blocking or passing messages sent via a firewall, based on parsing, of symbols strings contained in said messages, among different keywords, assigning to said messages either a blocking class or a passing class.

BACKGROUND OF THE INVENTION

Machine learning is focused on creating new algorithms based on probability theory and statistics to perform tasks such as classification or regression. Classification is the task of assigning a label to an unseen data point given a training set of previously classified elements. Regression is the task of learning an unknown function from a set of points sampled from the function. Feature extraction consists in creating a suitable representation of the data under classification such that classification algorithms can work with sufficient accuracy and solve a given problem.

The majority of algorithms in machine learning rely on an embedding between the data analyzed and a mathematical structure, like a vector space. Quantum mechanics is a theory that models with mostly linear algebra the behavior of particles at the smallest scales of energy. It is believed that quantum computers can offer an exponential speedup in terms of data processing capabilities.

The invention proposes a method to perform malware detection using in some intermediate steps a quantum computer. The procedure is simulated on a public dataset of internet domain names. Part of the dataset consists in domains generated by a malware, and the other part consists in existent and valid domains. The method according to the invention can either be performed on quantum computers, or be simulated with classical computer the operations that the quantum computer is supposed to run on a dataset obtained reducing the dimension of the problem such that it was possible to fit a classical computer.

An issue in computer security, specifically for a network administration, is the detection of algorithmically generated domains name in the DNS queries from the network to the internet. These queries are potential indicator of a compromised network, as such a network that presents this behavior has nodes being infected with malware. In fact, machine infected by malware needs to communicate with the command and control server of the owner of the botnet. In order to find the IP of the owner, they rely on an internal algorithm that generates random domain, using a seed pre-shared with the owner of the botnet. Each time the bot needs to communicate with the boot master, it generates and resolves a huge amount of new domain names based on the seed, which will result in many NXDOMAIN responses (i.e. the domain does not exist). This is called domain-flux. Only one of these queries DNS will be answered with the correct IP of the command and control server, registered in due time by the owner of the botnet. In this way, the malware can communicate with a server owned by the botmaster, without encoding information inside the code of the malware that could be extracted by reverse engineering and used to block the botnet.

The invention intends to use machine learning techniques to discriminate between human generated domains and the domain-flux.

In order to increase the accuracy of such machine learning systems, more clever techniques to process the data are needed, and quantum computers offer alternatives to the paradigm of classical computation. In this invention, a quantum procedure based on other works in quantum computation is used, such as quantum phase estimation and quantum singular value decomposition, to build a subroutine that performs the feature extraction.

Other solutions proposed so far are exclusively executed using machine learning algorithms on classical computer. Moreover, the data structure that is built following the current best practice is used with algorithms that are linear in the dimension of the problem. This means that the information that can be extracted from the data structure which is created is limited. Much powerful algorithm could be employed, but their current usage is prevented from the high dimension of the problem. This is because of the dimension of the matrix which is built by tokenizing the elements in the dataset which is too big to be handled with other linear algebraic methods.

No hybrid quantum-classical procedure is targeting this problem, thus our invention represents an unprecedented innovation in the field of quantum algorithms and detection of algorithmically generated domain names.

The performances of a classification algorithm are measured using several possible metrics. One of these is classification accuracy: the percentage of correctly classified values in a set of patterns whose labels are known, but are not used in the training procedure.

Experimentally, is it easy to implement simple classifiers using open source library. For instance, "Andrev Abakumov 2016" [Andrev Abakumov https://github.com/andrewaeva/DGA] used scikit-learn to reach an accuracy of:

Logistic Regression: 88.5%
Naive Bayes: 89.3%
Decision Trees: 91.4%

SUMMARY OF THE INVENTION

The object of the present invention is to alleviate at least partly the above mentioned drawbacks.

More particularly, the invention aims to a method of blocking or passing messages sent via a firewall, based on parsing, of symbols strings contained in said messages, among different keywords, assigning to said messages either a blocking class or a passing class which fulfills a good compromise between on the one hand its accuracy and on the other hand its rapidity. Indeed, in embodiments of the invention, the accuracy is somewhat better than in prior art, whereas the rapidity is much higher, because of by-passing very demanding calculations and replacing them by much easier indeed faster to perform, but still sufficient indeed equivalent for the contemplated application, satisfactory calculations.

This invention is the result of the meeting of two very different technical fields which are far away from each other: the technical field of firewall checking messages transmission on the one side, where there are many very practical problems to solve but few, if any, effective solutions to work, and the technical field of quantum circuit on the other side, where there are quite amazing theoretical tools but little practical and interesting application to confirm practical interest.

Indeed:

the technical field of firewall checking messages transmission attends to replace human know-how on message content extraction and assessment which are both very difficult tasks where the human brain mysteriously easily succeeds whereas the computer, on the contrary, even when quite powerful, often seems at a loss of becoming successful in a repeated and reliable way, because:

classical computers, even high performance cluster of classical computers, do not give very good results, even if the global capabilities of the whole cluster contemplated looks impressive, all the more that the amount of data to be processed is still expected to grow further, computers based on neural networks may give better results but they are very difficult to implement and even more difficult to train in an efficient way, once more all the more in a repeated and reliable way, the technical field of quantum circuit is a rather brand new technology, at least for practical applications, even if theory has been developed decades ago, which is fast growing, which looks like very promising in solving at least some types of rather specific calculation problems, but which is not yet fully convincing in building algorithms which can really be considered both as useful and efficient, and which would successfully solve practical and interesting problems, not only show theoretical capabilities in solving abstract and specific calculation problems thereby advantageously comparing with more classical computers.

In the application of firewall checking messages transmission, a lot of calculations are implied.

In the core of these complex calculations, the invention has identified a particularly difficult calculating step to perform.

The invention rather proposes to by-pass this "particularly difficult calculating step" than to perform it, and to replace it by an easier calculating step practically as efficient as this "particularly difficult calculating step" in specific circumstances of implementation.

The invention proposes to implement a specific trick made possible by quantum calculation in order to by-pass a specific difficulty within the full processing of firewall checking messages transmission.

The invention proposes that:

instead of calculating the product of two huge matrices which both matrices represent two different relations between keywords and symbols strings and which product is required to correctly perform checking messages transmission via performing dimensionality reduction for different classes of messages, first, only the eigenvalues of both these matrices are estimated, and second, the eigenvalues of the product of these matrices is directly estimated from the eigenvalues of both these matrices, without effectively calculating this product of matrices, taking into account the fact that, knowing only the eigenvalues of this product of matrices is sufficient indeed, and that, it is indeed not compulsory to effectively calculate this product of matrices in order to correctly perform checking messages transmission.

This invention may be applied more generally to other problems implying a product of two huge matrices performed within a dimensionality reduction step in any method of analysis of messages other than checking messages transmission, deeming to replace human know-how in order to automate such messages analysis, and to automate it in a much quicker way than the manual way.

To implement this dimensionality reduction step including a first estimation of only the eigenvalues of both these matrices and a second estimation of the eigenvalues of the product of these matrices directly performed from the eigenvalues of both these matrices and without effectively calculating this product of matrices, the invention also proposes:

a phase estimation of an entity performing some specific quantum steps, and/or a specific quantum circuit based on Hadamard gates and on inverted quantum Fourier transform components, used a specific way by successive implementations of both matrices in using a quantum memory controlled by at least part of these Hadamard gates and these inverted quantum Fourier transform components.

Machine learning techniques are used in combination with quantum circuits, either deep learning or other machine learning method. This combination, between a technique offering rich tools to mimic human behavior and another technique offering huge calculating capabilities far beyond the human brain, has ended up into a very powerful efficiency while still keeping flexibility.

Neural network also could be used in combination with quantum circuits.

This object is achieved with a method of blocking or passing messages sent via a firewall, based on parsing, of symbols strings contained in said messages, among different keywords, assigning to said messages either a blocking class or a passing class, comprising: performing a dimensionality reduction step for said different classes on a training set of messages whose classes are known, and then classifying one or more unknown messages among said different classes with reduced dimensionality, said dimensionality reduction step being performed on said training set of messages by machine learning including processing, for several first matrices and for several second matrices, a parameter representative of a product of two first and second matrices to assess to which given class a given message belongs: first matrix representing a first array of keywords versus symbols strings contained in a first given message, second matrix representing the values of differences between said first array and a second array of keywords versus symbols strings contained in a second given message different from first given message but known to belong to same class as first given message, wherein: a quantum singular value estimation is performed on first matrix, a quantum singular value estimation is performed on second matrix, both quantum singular value estimation of first matrix and quantum singular value estimation of second matrix are combined together, via quantum calculation, so as to get at a quantum singular value estimation of said product of both first and second matrices, said quantum singular value estimation of said product of both first and second matrices being said parameter representative of said product of two first and second matrices processed to assess to which given class said first given message belongs.

This object is also achieved with a method of blocking or passing transmitted messages within a firewall, based on parsing, of symbols strings contained in said messages, among different classes, comprising: performing a dimensionality reduction step, by processing, for several first matrices and for several second matrices, a parameter representative of a product of both first and second matrices respectively representing first and second arrays of keywords versus symbols strings related to one or more messages, wherein: a quantum singular value estimation is performed on first matrix, a quantum singular value estimation is performed on second matrix, both quantum singular value estimation of first matrix and quantum singular value estimation of second matrix are combined together, via quantum calculation, so as to get at a quantum singular value estimation of said product of both first and second matrices, said quantum singular value estimation of said product of both first and second matrices being said parameter representative of said product of both first and second matrices.

This object is also achieved with a method of blocking or passing transmitted messages within a firewall, based on parsing, of symbols strings contained in said messages, among different classes, comprising: performing a dimensionality reduction step, by processing, for several first matrices and for several second matrices, a parameter representative of a product of both first and second matrices respectively representing first and second arrays of keywords versus symbols strings related to one or more messages, wherein: both quantum singular value estimation of first matrix and quantum singular value estimation of second matrix are estimated each and are combined together so as to get at a quantum singular value estimation of said product of both first and second matrices, by making a phase estimation of an entity at least successively performing: quantum singular value estimation of first matrix, quantum rotations, proportional to estimated singular values of first matrix, preferably quantum rotations on Y axis of Bloch sphere, proportional to estimated singular values of first matrix, quantum singular value estimation of second matrix, quantum rotations, proportional to estimated singular values of second matrix, preferably quantum rotations on Y axis of Bloch sphere, proportional to estimated singular values of second matrix, said quantum singular value estimation of said product of both first and second matrices being said parameter representative of said product of both first and second matrices.

This object is also achieved with a method of blocking or passing transmitted messages within a firewall, based on parsing, of symbols strings contained in said messages, among different classes, comprising: performing a dimensionality reduction step, by processing, for several first matrices and for several second matrices, a parameter representative of a product of both first and second matrices respectively representing first and second arrays of keywords versus symbols strings related to one or more messages, wherein: both quantum singular value estimation of first matrix and quantum singular value estimation of second matrix are estimated each and are combined together so as to get at a quantum singular value estimation of said product of both first and second matrices, by applying to both first and second matrices following quantum circuit including: a first Hadamard gate whose output is the input of a first inverted quantum Fourier transform, said first Hadamard output controlling following sub-circuit, a second Hadamard gate whose output is the input of a second inverted quantum Fourier transform, said second Hadamard output controlling a quantum memory, output of said first inverted quantum Fourier transform will give said quantum singular value estimation of said product of both first and second matrices, once said quantum memory has successively contained first matrix and second matrix, said quantum singular value estimation of said product of both first and second matrices being said parameter representative of said product of both first and second matrices.

This object is also achieved with a method of blocking or passing transmitted messages within a firewall, based on parsing, of symbols strings contained in said messages, among different classes, comprising: performing a dimensionality reduction step, by processing, for several first matrices and for several second matrices, a parameter representative of a product of both first and second matrices respectively representing first and second arrays of keywords versus symbols strings related to one or more messages, wherein: both quantum singular value estimation of first matrix and quantum singular value estimation of second matrix are estimated each and are combined together so as to get at a quantum singular value estimation of said product of both first and second matrices, by making a phase estimation of an entity at least successively performing: quantum singular value estimation of first matrix, quantum rotations, proportional to estimated singular values of first matrix, preferably quantum rotations on Y axis of Bloch sphere, proportional to estimated singular values of first matrix, quantum singular value estimation of second matrix, quantum rotations, proportional to estimated singular values of second matrix, preferably quantum rotations on Y axis of Bloch sphere, proportional to estimated singular values of second matrix, while applying to both first and second matrices following quantum circuit including: a first Hadamard gate whose output is the input of a first inverted quantum Fourier transform, said first Hadamard output controlling following sub-circuit, a second Hadamard gate whose output is the input of a second inverted quantum Fourier transform, said second Hadamard output controlling a quantum memory, output of said first inverted quantum Fourier transform will give said quantum singular value estimation of said product of both first and second matrices, once said quantum memory has successively contained first matrix and second matrix, said quantum singular value estimation of said product of both first and second matrices being said parameter representative of said product of both first and second matrices.

Preferably, it is a method of blocking or passing messages sent via a firewall, based on parsing, of symbols strings contained in said messages, among different keywords, assigning to said messages either a blocking class or a passing class, and wherein: said dimensionality reduction step is performed for said different classes on a training set of messages whose classes are known, and then classifying one or more unknown messages among said different classes with reduced dimensionality, said dimensionality reduction step is performed on said training set of messages by machine learning including processing, for several first matrices and for several second matrices, a parameter representative of a product of two first and second matrices to assess to which given class a given message belongs: first matrix representing a first array of keywords versus symbols strings contained in a first given message, second matrix representing the values of differences between said first array and a second array of keywords versus symbols strings contained in a second given message different from first given message but known to belong to same class as first given message.

According to embodiments of the invention, assuming access to a quantum computer, it is possible to perform computations that were previously thought impossible on classical computers, due to the dimension of the dataset. In this procedure, such a case is contemplated, where the quantum computer is used to process a token-matrix resulting from the n-gram decomposition of domain names. The quantum algorithm is exponentially faster than a classical algorithm with respect to the asymptotic complexity of the number of data points and the dimension of the vectors. It is believed that quantum computer will help better solving certain problems, problems based on linear-algebraic operations on huge datasets.

To experiment the validity of the method of blocking or passing messages sent via a firewall without a quantum computer, the size of the problem was reduced such that a simulation of the quantum procedure can be run on classical computers.

This simulation proves that the features extracted using the quantum procedure proposed are effectively useful to increase the accuracy of a classifier, an interesting metric to test the validity of machine learning algorithms.

Preferred embodiments comprise one or more of the following features, which can be taken separately or together, either in partial combination or in full combination, in combination with any of preceding objects of the invention.

Preferably, said first matrices and said second matrices are sparse matrices.

This method of firewall checking messages transmission according to the invention, is all the more useful and easier to get at the wished result directly, without calculating the full product of both matrices, that these matrices have more and more null elements in their rows and columns, the optimal being achieved for sparse matrices, which is indeed the case for these matrices which are used in the dimensionality reduction step of the firewall checking messages transmission method.

Preferably, operation of said combination of both quantum singular value estimation of first matrix and quantum singular value estimation of second matrix together, via quantum calculation, so as to get at a quantum singular value estimation of said product of both first and second matrices, is used to replace either an operation of matrices multiplication and/or an operation of matrix inversion on matrices multiplication.

This method of firewall checking messages transmission according to the invention, is particularly efficient and useful to replace some calculations which would otherwise remain very hard and complex operations, among which there are first matrices multiplication and second matrix inversion on matrices multiplication.

DETAILED DESCRIPTION OF THE INVENTION

Figure 1:
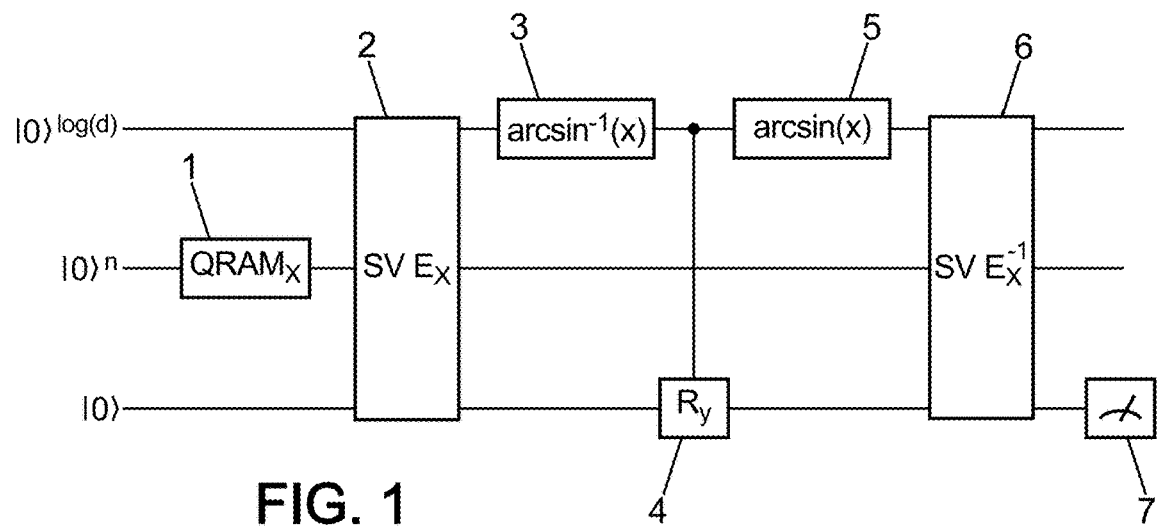
FIG. 1 shows an example of a block diagram representing a quantum subroutine called UW used in a method of blocking or passing messages sent via a firewall according to an embodiment of the invention.

Qubit or qbit will be indifferently used throughout whole text, it means a quantum bit.

Using a quantum computer with the procedure discussed here, it is possible to increase the accuracy of the classifier by extracting more meaningful features form the tokenization matrix.

The quantum computation that is performed is a hyper-parameter-free quantum procedure that is used to perform the feature extraction. This procedure to classify a domain consists in a quantum algorithm to perform the feature extraction and in a classical computer to perform classification which uses classical features, along with the feature extracted from the quantum computer. The procedure described is parameterized by a value theta, a parameter that depends on a given dataset. Details will be given below on how to estimate theta for a given dataset in the procedure.

This is the setting that is considered: assumption is made to have a dataset of N domains with 2 different labels: good and malicious. Supposition is made that a new domain is given with an unknown label, and there is a need to find the correct label for the domain under consideration. The quantum algorithm for feature extraction uses a recent scientific breakthrough, called singular value estimation. Quantum singular value estimation allows for building a superposition of the singular values of a given matrix stored in QRAM in time poly logarithmic in the matrix dimension.

The following procedure uses a quantum computer to execute the operations on step number 8a. This quantum procedure will use a data structure called QRAM that is described in "Kerenidis 2016" [Kerenidis, Iordanis, and Anupam Prakash. 2017. "Quantum gradient descent for linear systems and least squares," April. http://arxiv.org/abs/1704.04992] hereby incorporated by reference. A QRAM is a data structure where the quantum computer can have quantum access, and it is the device used to input data in a quantum computer.

According to embodiments of the invention, following steps 1 to 10 are performed successively, with sub-steps a, b, c etc. . . . for part of them:

1. Collection the domains to be used as training set. This step is important, as the elements in the dataset should resemble as much as possible the elements that the system will have to classify when executed. Possibly, they should not have misclassified elements; otherwise the performance of the classifier may be affected. For this, publicly available datasets of malware domains can be taken, or even the source code of malware that is publicly available, and use it to generate the training set.

2. Create the tokenization matrix. Map the good domains in a feature matrix as follow: This consists in splitting each domain in the training set in a series of n-grams of length 2, 3, 4. Then, create a matrix where the rows are the good domains and the columns are the n-grams extracted. Fill the matrix with 1 if in a domain there is a given n-gram. This will result in a sparse matrix. this matrix can be saved in a QRAM or stored in another data structure that can offer quantum access to this matrix.

3. This row is then eventually polynomially expanded (usually a polynomial of degree 2 or 3 suffices).

4. Each vector is eventually normalized by removing the mean of the vectors in the training set.

5. Each component is eventually scaled such that each component of the input vectors has unitary variance if calculated among all the vectors in the dataset.

6. This resulting matrix is stored into QRAM, that is called QRAM for X.

7. Construction of QRAM for X_DOT. X_DOT is defined to be a matrix whose rows are samples of the pairwise derivatives of the data which is constructed. Take a number of samples that is at least linear in the number of elements in the dataset X.

8. For each vector in the training set, do the following operation:

a. With the quantum computer, apply routine UFE on the selected vector, perform tomography of the resulting quantum state. This is the resulting state that can be found after the application of quantum slow feature analysis with 2 as parameter for the number of classes.

9. Run the training procedure. Use the feature extracted using the quantum computer along with entropy, length. Other relevant information might include the time frequency of DNS queries of a given IP address of the network.

10. When a new domain served to the detection system in order to be classified, a. Tokenize the domain using the previously learned decomposition, and get its representation as vector.

b. Perform quantum feature extraction on this vector using UFE, a quantum procedure (described below) on the vector just created.

c. Extract classically other feature like length and entropy.

d. Perform the classification using the model trained in the previous step.

Once the system to perform classification is ready, the problem of finding an estimate for the parameter theta is the task to be done. In case of binary classification, the parameter theta is determined by checking (using tomography) that the resulting vectors are 1 dimensional (i.e. a single number). This is because the parameter theta influences the number of dimensions the output vector has.

At the end of the quantum computation, the register holds the feature that has been extracted from an input vector (or a superposition of vectors).

FIG. 1 shows an example of a block diagram representing a quantum subroutine called UW used in a method of blocking or passing messages sent via a firewall according to an embodiment of the invention.

A QRAM of X 1 is connected to an input of a SVE 2 of X. A first output of SVE 2 is connected to the input of an inverted arcsine function 3 whose output is connected to an arcsine function 5 and controls a Y rotation 4. A second output of SVE 2 is directly connected to a second input of an inverted SVE 6 of X. Y rotation 4 is connected between a third output of SVE 2 and a third input of inverted SVE 6. A qubit measure 7 is performed on third output of inverted SVE 6.

This procedure takes as input a quantum register and two ancillary register, and output a quantum register. It uses multiple calls to the QRAM of X. Following steps 1 to 5 will be successively performed:

1. Perform Singular Value Estimation (as in Kerenidis 2016 already incorporated by reference) to write in a register the singular values of the matrix X in superposition.

2. Then, by using arithmetic operations on quantum register, exploit the symmetry of trigonometric functions to map each singular value in its inverse. This can be done using a library for arithmetic operations on a quantum computer.

3. Execute a Y rotation over an ancillary qubit controlled on the register created in the previous step.

4. Execute the inverse of the trigonometric function and the inverse of the circuit used to perform SVE (singular value estimation) on X, in this way the quantum register used to store the superposition of singular values is emptied.

5. Optionally, measure the ancilla qubits until 0 is read. In case 1 is read, repeat the procedure. This step can be postponed to the end of the quantum program. This will allow for applying techniques of amplitude amplification to speedup even further the estimation of the final result, which is contained in the middle register.

Figure 2:
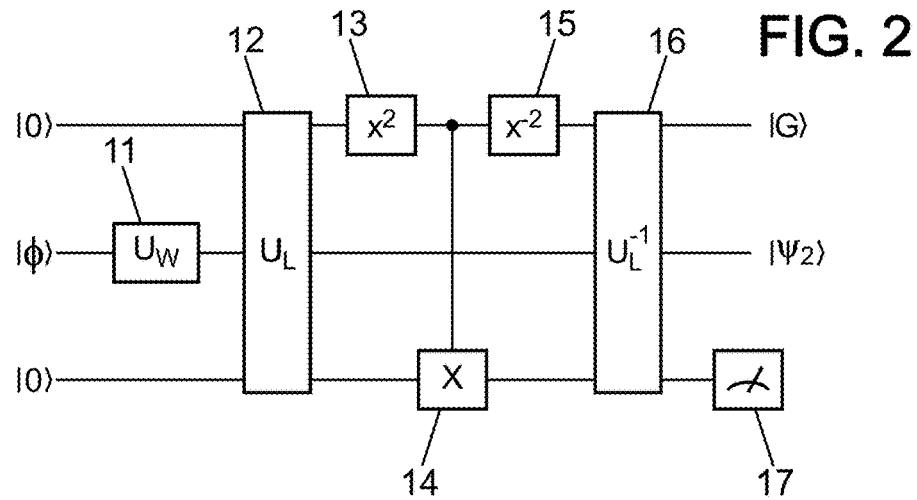
FIG. 2 shows an example of a block diagram representing a quantum subroutine called UP used in a method of blocking or passing messages sent via a firewall according to an embodiment of the invention.

FIG. 2 shows an example of a block diagram representing a quantum subroutine called UP used in a method of blocking or passing messages sent via a firewall according to an embodiment of the invention.

The quantum subroutine UW 11 of FIG. 1 is connected to an input of quantum subroutine UL 12 which will be described in FIG. 3. A first output of quantum subroutine UL 12 is connected to the input of a square function of X 13 whose output is connected to an inverted square function of register X 15 and controls X referenced 14. A second output of subroutine UL 12 is directly connected to a second input of an inverted subroutine UL 16. Register X 14 is connected between a third output of subroutine UL 12 and a third input of inverted subroutine UL 16. A qubit measure 7 is performed on third output of inverted subroutine UL 16.

This procedure takes as input a quantum register and two ancillary register, and output a quantum register. Following steps 1 to 5 will be successively performed:

1. Use UL to store in a quantum register the singular values of the matrix in superposition.

2. Using a quantum linear algebra library, square the values of the first register, as shown in the image.

3. Execute a controlled negation gate over an ancillary qubit parameterized by theta.

4. Execute the inverse of the square of the first register and the inverse of UL, in this way the quantum register used to store the superposition of singular values will be emptied.

5. Optionally, measure the ancilla qubits until 0 is read. In case 1 is read, repeat the procedure. This step can be postponed to the end of the quantum program. This will allow for applying techniques of amplitude amplification to speedup even further the estimation of the final result, which is contained in the middle register.

Figure 3:
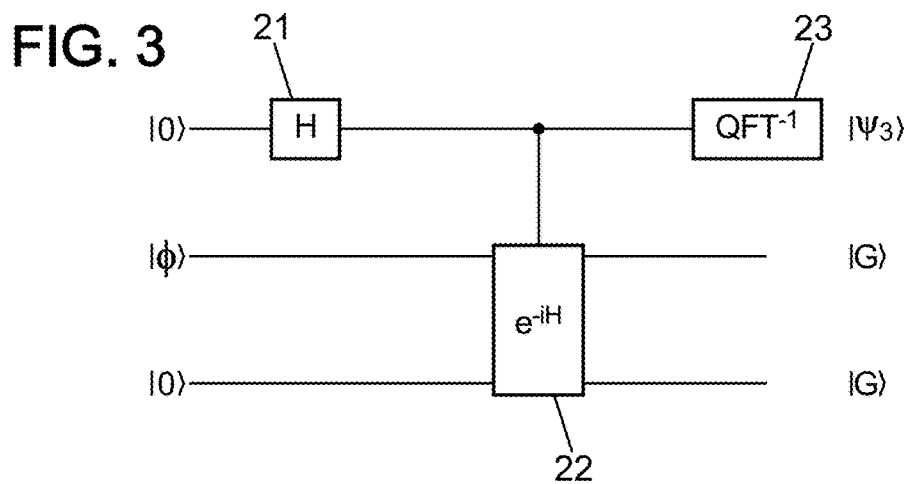
FIG. 3 shows an example of a block diagram representing a quantum subroutine called UL used in a method of blocking or passing messages sent via a firewall according to an embodiment of the invention.

FIG. 3 shows an example of a block diagram representing a quantum subroutine called UL used in a method of blocking or passing messages sent via a firewall according to an embodiment of the invention.

Output of an Hadamard 21 is connected to input of an inverted Quantum Fourier Transform 23 (QFT) and controls a quantum subroutine called e^(iH) 22 which will be described below in more details through following sub-steps 2.1 to 2.3.

This step is used to create a quantum register with the superposition of the singular values of the product of two matrices X and X_dot, having them stored in QRAM. This procedure takes as input a quantum register, and two ancillary register. It is to be noted that, since calculating the singular values of the product of two matrixes has never been done before, this represents an unprecedented step that no one has ever done before on a quantum computer. This new step is an effort combining previous results in quantum information, using phase estimation and singular value estimation algorithms. Following steps 1 to 3 will be successively performed:

1. Create, using an Hadamard, a uniform superposition of elements in an index register. Use this register to perform phase estimation as such.

2. Controlled on the index register, do the following unitary:

2.1. Apply a Hadamard gate in order to create a uniform superposition of values on another register.

2.2. Controlled on the second index register, execute on a new register SVE on X and controlled operation to apply the matrix X to the quantum state, and execute on a new register SVE on X_dot and controlled operation to apply the matrix X_dot on the state.

2.3. Perform amplitude amplification on 0 on the second index register.

3. Perform a QFT on the first register.

In the image that represents the quantum circuit, steps 2.1 to 2.3 are executed inside the controlled unitary matrix that is called e^(iH) 22.

To be more precise and more detailed about what is done in quantum subroutine UL and in the controlled unitary matrix that is called e^(iH) 22, here are some complementary explanations.

Performing "controlled operations" means that there are two register: A and B. Generically, an operation on the register B is performed if the register A is in a certain state. Since the register A is in a superposition of states, multiple operations are performed on the second register as well.

For doing quantum subroutine UL, following operations are done:

On the first register the superposition (with Hadamard matrix) of all the numbers from 0 to some integer N is created. Then, controlled on this register, all the following operations are done:
  apply the first matrix,
  apply the second matrix,
  Then, perform the QFT^{-1} (inverted Quantum Fourier Transform) to read (magically) the eigenvalues (singular values) of the product of the two matrices stored in QRAM.
  "apply the matrix" means the following steps:
  perform singular value estimation to write the eigenvalues of a matrix in a new register,
  add a new ancilla qubit,
  perform a rotation on the Y axis on the ancilla qubit controlled on the register that has the superposition of singular values. The rotation is proportional to the singular value written in the register. Since there are many of them (is a superposition), basically more controlled rotations are performed "at the same time".
  perform the inverse of singular value estimation to empty the register with the singular values. The Y axis is really the Y axis in X, Y, Z axis of a 3-Dimensional sphere that represents the qubit, which is also called the Bloch Sphere.

Now, UFE is described as well as its use in classification.

This procedure uses access to the QRAM of the tokenized matrix X and the derived matrix X_dot, and ensures a vector which can be used as feature for subsequent classification. In practice, tomography is performed after UFE. Basically extract features using the quantum computer.

Figure 4:
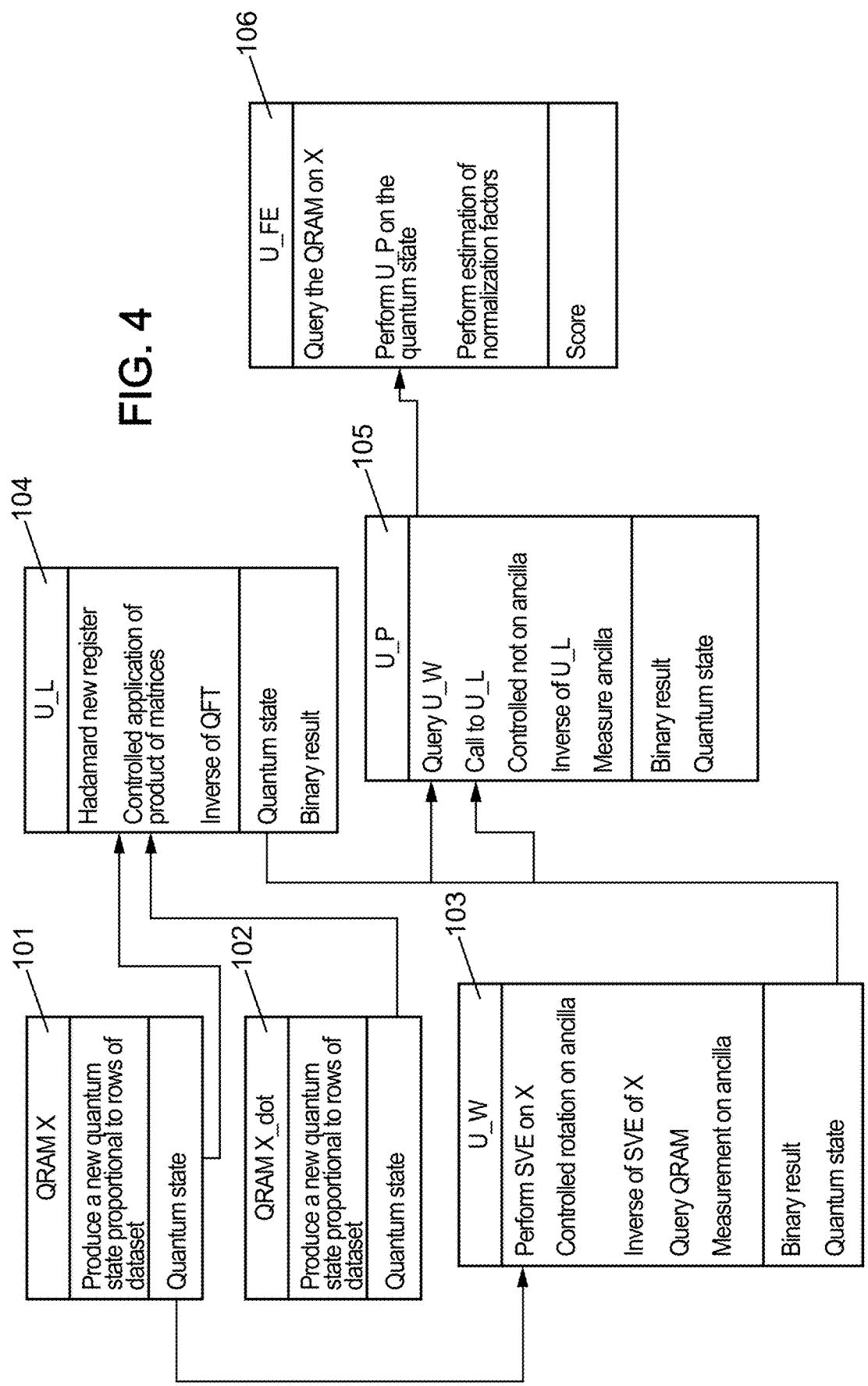
FIG. 4 shows an example of a block diagram representing the relationships existing between the different quantum subroutines used in a method of blocking or passing messages sent via a firewall according to an embodiment of the invention.

FIG. 4 shows an example of a block diagram representing the relationships existing between the different quantum subroutines used in a method of blocking or passing messages sent via a firewall according to an embodiment of the invention.

QRAM of X 101 is used by quantum subroutine UW 103 and by quantum subroutine UL 104. QRAM of X_dot 102 is used by quantum subroutine UL 104. Quantum subroutine UW 103 is used by quantum subroutine UP 105. Quantum subroutine UL 104 is used by quantum subroutine UP 105. Quantum subroutine UP 105 is used by quantum subroutine UFE 106.

On FIG. 4, there is the description of the relationship between the quantum operations which are executed on the quantum computer.

Due to the nature of quantum computers, each step might use multiple oracle calls to other subroutines. For instance, the quantum circuit that named $U_L$ is used inside the subroutine named $U_P$. The quantum circuit named $U_W$ is used only inside the quantum circuit $U_P$. The subroutine UFE used to calculate the extracted feature, (which will be used to perform classification) calls $U_P$ for each domain in the dataset. The two oracles (called QRAM in quantum machine learning context) for X and for X_dot are used both to create the quantum states that represent the data, and inside the function calls of singular values estimation that are used inside UL and $U_W$.

Now a specific example will be described in more details.

In order to prove that a new classification procedure works, in practice, it is usually tested on public datasets. The previous procedure is tested with classical software that simulates the quantum procedure, and tested against a dataset specifically suited for this task.

This dataset has been generated from publicly available databases of source code of malware called "cryptolocker", which has been used to generate 8.056 malicious domains. The well-known "Alexa's list" of the top 1 million domains was used as sample of non-malicious domains.

The previous procedure thus finds implementation on real data in the following steps 1 to 7:

1. Generate some domain using the malware database found in "Andrew Aeva 2017" [Reference: Andrev Abakumov https://github.com/andrewaeva/DGA] hereby incorporated by reference. Since the data structures which are going to be created in the simulation are too big for classical computers, the dataset has been reduced in the following way. First, the 16 most used letters in the "Alexa" list of good domains were found. Then, only good domains containing only those letters were tested. This reduced the dataset to 72687 domains. Then, many DGA domains were generated and the same kind of filtering we performed thereby obtaining the 8056 domains.

2. Generate the token matrix. This can be done with sklearn as follow:
object=CountVectorizer(analyzer='char', ngram_range=(3, 5))
  counts_matrix=object.fit_transform(domains_list)

3. Preprocess the token matrix.
a) Normalized such that the average of each component of the vector is 0.
b) Scaled such as the variance of each component of the vector is 1.

4. Store X in QRAM. The preprocessed data represented by a matrix X is then stored in the software simulation. This consists into creating a suitable representation of the QRAM for the matrix X.

5. Generate and Store X_dot. Samples from the derivatives of the normalized dataset are taken, forming the second matrix X_dot. This data is stored in the second software representation of a QRAM data structure.

6. Simulate the quantum software for feature extraction. The simulation of the operation performed by the quantum circuits is performed. In this embedding, the linear-algebraic operation of quantum mechanics is simulated.

7. Train and test the classifier with the extracted feature. Now, any classical classification algorithm can be used to classify the received domain between good or malicious. This can be done again with sklearn or other machine learning toolkit.

Execution is performed on a real data to prove high accuracy of classification procedure.

This is an important key for claiming that a written a procedure which uses quantum computer indeed works in practice. In order to claim that the procedure will work on real quantum computers, it is interesting to show that the values extracted from the quantum procedure actually are useful to improve the classification accuracy of the classical algorithm. To do this, the quantum subroutines using a classical computer are simulated, mimicking the same linear algebraic procedure executed inside the quantum algorithm.

The simulation has been done using the same tools used in "Andrev Abakumov" [Andrev Abakumov https://github.com/andrewaeva/DGA] hereby incorporated by reference: panda (a tool for handling datasets), sklearn, (a python machine learning library). This library has been used for:

Simulating part of the quantum algorithm and the tomography step assuming no error on the quantum hardware.

the dataset the same mapping performed using the proposed invention in the quantum computer and uses optimization algorithm tuned for the matrix that is given as input.

Running the classification procedure with the feature extracted from the quantum simulation. Again, this is done using sklearn tools.

The increased accuracy obtained using the feature extracted from the simulated quantum procedure, apart from a very substantive speed up of the whole processing, is the following:

Logistic Regression: 90.5% (+1.5%)

Naive Bayes: 92.3% (+3%)

Decision Trees: 94.0% (+2.6%)

It is believed to have given evidence that with quantum computer it is possible to help to the resolution of classical problems. The performance of the quantum step depends on other parameters which are believed to be efficient for quantum algorithms:

The conditioning number of a matrix is the ratio between the bigger and the smaller singular value. The runtime of the quantum procedure depends on the conditioning number of the matrix of the dataset, which is 14. This is one order of magnitude smaller than the conditioning number of other datasets studied in quantum machine learning algorithms.

The runtime of the quantum procedure depends on the 11 norm of the dataset. The 1_1 norms of the rows inserted in the quantum algorithms are constant and will not increase significantly as the dataset increase.

Beginning of Code

Now, a part of the implementation will be given in more details through giving a part of code extracting the feature from the data and preparing the training set for the classifier.

```
# extract length, entropy and perform the tokenization of the dataset set.
all_domains, alexa_sfa_features, alexa_sfa_features_3, alexa_sfa_features_4,
alexa_sfa_features_5 = preprocessing_data(parsed_args)
# create the training set and the test set
training_set, test_set, training_sfa, test_sfa= train_test_split(all_domains,
alexa_sfa_features_4, test_size=0.2)
# converting to a suitable representation the data
training_set_as_matrix = training_set.as_matrix(['domain', 'length', 'entropy',
'alexa_grams']) # add word_grams e word_frequencies..
test_set_as_matrix = test_set.as_matrix(['domain', 'length', 'entropy', 'alexa grams'])
# add word_grams e word_frequencies..
train_labels  = np.array(training_set['class'].tolist( ))
test_labels  = np.array(test_set['class'].tolist( ))
# convert the token matrix in a suitable format for the simulation
d_training_sfa=training_sfa.todense( )
#y_train_slow, y_test_slow = feature_extraction (d_training_sfa, test_sfa.todense( ),
train labels, parse_dargs)
y_train_lda, y_test_1da = feature extraction (d_training_sfa, test sfa.todense( ),
train_labels, parsed_args)
```

This step has been simulated using LinearDiscriminantAnalysis (for 2 components) on the dataset extracted as described. In fact, given a suitable representation of the input data, LinearDiscriminantAnalyis perform on Comparison of the different accuracy reached by the same classification procedure with a training set enhanced by the feature extracted from the simulation of the quantum algorithm.

```
training_set_as_matrix_enhanced = np.concatenate((training_set_as_matrix[:,:-1],
y_train_lda), axis=1)
test_set_as_matrix_enhanced = np.concatenate((test_set_as_matrix[:,:-1], y_test_lda),
axis=1)
classify(training_set_as_matrix_enhanced[:,1:],  test_set_as_matrix_enhanced[:,1:],
train_labels, test_labels)
```

```
classify(training_set_as_matrix[:,1:-1], test_set_as_matrix[:,1:-1], train_labels,
test_labels)
```

Here the function classify run the classification algorithm that was seen in the previous section. The first time it is called with the dataset extended with the new feature from the simulation of the quantum procedure.

End of Code

The invention claimed is:

1. A computer-implemented method of blocking or passing transmitted messages within a firewall, based on parsing, of symbols strings contained in said messages, among different classes, comprising:
performing a dimensionality reduction step, by processing, for several first matrices and for several second matrices, a parameter representative of a product of both first and second matrices respectively representing first and second arrays of keywords versus symbols strings related to one or more messages,
wherein:
a quantum singular value estimation is performed on first matrix,
a quantum singular value estimation is performed on second matrix,
both quantum singular value estimation of first matrix and quantum singular value estimation of second matrix are combined together, via quantum calculation, so as to get at a quantum singular value estimation of said product of both first and second matrices,
said quantum singular value estimation of said product of both first and second matrices being said parameter representative of said product of both first and second matrices.

2. The computer-implemented method according to claim 1, based on parsing, of symbols strings contained in said messages, among different keywords, assigning to said messages either a blocking class or a passing class, wherein:
said dimensionality reduction step is performed for said different classes on a training set of messages whose classes are known, and then one or more unknown messages are classified among said different classes with reduced dimensionality,
said dimensionality reduction step being performed on said training set of messages by machine learning including processing, for several first matrices and for several second matrices, a parameter representative of a product of two first and second matrices to assess to which given class a given message belongs:
first matrix representing a first array of keywords versus symbols strings contained in a first given message,
second matrix representing the values of differences between said first array and a second array of keywords versus symbols strings contained in a second given message different from first given message but known to belong to same class as first given message,
and wherein said quantum singular value estimation of said product of both first and second matrices being said parameter representative of said product of two first and second matrices are processed to assess to which given class said first given message belongs.

3. The computer-implemented method according to claim 1, wherein:
both quantum singular value estimation of first matrix and quantum singular value estimation of second matrix are estimated each and are combined together so as to get at a quantum singular value estimation of said product of both first and second matrices, by making a phase estimation of an entity at least successively performing:
quantum singular value estimation of first matrix,
quantum rotations, proportional to estimated singular values of first matrix,
quantum singular value estimation of second matrix,
quantum rotations, proportional to estimated singular values of second matrix,
said quantum singular value estimation of said product of both first and second matrices being said parameter representative of said product of both first and second matrices.

4. The computer-implemented method according to claim 3, wherein the step of performing quantum rotations proportional to estimated singular values of first matrix, comprises performing quantum rotations on Y axis of Bloch sphere, proportional to estimated singular values of first matrix.

5. The computer-implemented method according to claim 4, wherein the step of performing quantum rotations proportional to estimated singular values of second matrix, comprises performing quantum rotations on Y axis of Bloch sphere, proportional to estimated singular values of second matrix.

6. The computer-implemented method according to claim 3, wherein the step of performing quantum rotations proportional to estimated singular values of second matrix, comprises performing quantum rotations on Y axis of Bloch sphere, proportional to estimated singular values of second matrix.

7. The computer-implemented method according to claim 1, wherein the method performs blocking or passing messages sent via a firewall, based on parsing, of symbols strings contained in said messages, among different keywords, assigning to said messages either a blocking class or a passing class, and wherein:
said dimensionality reduction step is performed for said different classes on a training set of messages whose classes are known, and then classifying one or more unknown messages among said different classes with reduced dimensionality,
said dimensionality reduction step is performed on said training set of messages by machine learning including processing, for several first matrices and for several second matrices, a parameter representative of a product of two first and second matrices to assess to which given class a given message belongs:
first matrix representing a first array of keywords versus symbols strings contained in a first given message,
second matrix representing the values of differences between said first array and a second array of keywords versus symbols strings contained in a second given message different from first given message but known to belong to same class as first given message.

8. The computer-implemented method according to claim 1, wherein said first matrices and said second matrices are sparse matrices.

9. The computer-implemented method according to claim 1, wherein operation of said combination of both quantum singular value estimation of first matrix and quantum singular value estimation of second matrix together, via quantum calculation, so as to get at a quantum singular value estimation of said product of both first and second matrices, is used to replace either an operation of matrices multiplication and/or an operation of matrix inversion on matrices multiplication.

10. A computer-implemented method of blocking or passing transmitted messages within a firewall, based on parsing, of symbols strings contained in said messages, among different classes, comprising:
  performing a dimensionality reduction step, by processing, for several first matrices and for several second matrices, a parameter representative of a product of both first and second matrices respectively representing first and second arrays of keywords versus symbols strings related to one or more messages,
  wherein
  both quantum singular value estimation of first matrix and quantum singular value estimation of second matrix are estimated each and are combined together so as to get at a quantum singular value estimation of said product of both first and second matrices, by applying to both first and second matrices following quantum circuit including:
    a first Hadamard gate whose output is the input of a first inverted quantum Fourier transform,
    said first Hadamard output controlling following sub-circuit,
      a second Hadamard gate whose output is the input of a second inverted quantum Fourier transform,
      said second Hadamard output controlling a quantum memory,
    output of said first inverted quantum Fourier transform will give said quantum singular value estimation of said product of both first and second matrices, once said quantum memory has successively contained first matrix and second matrix,
  said quantum singular value estimation of said product of both first and second matrices being said parameter representative of said product of both first and second matrices.

11. A computer-implemented method of blocking or passing transmitted messages within a firewall, based on parsing, of symbols strings contained in said messages, among different classes, comprising:
  performing a dimensionality reduction step, by processing, for several first matrices and for several second matrices, a parameter representative of a product of both first and second matrices respectively representing first and second arrays of keywords versus symbols strings related to one or more messages,
  wherein:
  both quantum singular value estimation of first matrix and quantum singular value estimation of second matrix are estimated each and are combined together so as to get at a quantum singular value estimation of said product of both first and second matrices, by making a phase estimation of an entity at least successively performing:
    quantum singular value estimation of first matrix,
    quantum rotations, proportional to estimated singular values of first matrix,
    quantum singular value estimation of second matrix,
    quantum rotations, proportional to estimated singular values of second matrix, while applying to both first and second matrices following quantum circuit including:
      a first Hadamard gate whose output is the input of a first inverted quantum Fourier transform,
      said first Hadamard output controlling following sub-circuit,
        a second Hadamard gate whose output is the input of a second inverted quantum Fourier transform,
        said second Hadamard output controlling a quantum memory,
      output of said first inverted quantum Fourier transform will give said quantum singular value estimation of said product of both first and second matrices, once said quantum memory has successively contained first matrix and second matrix,
  said quantum singular value estimation of said product of both first and second matrices being said parameter representative of said product of both first and second matrices.

12. The computer-implemented method according to claim 11, wherein the step of performing quantum rotations proportional to estimated singular values of first matrix, comprises performing quantum rotations on Y axis of Bloch sphere, proportional to estimated singular values of first matrix.

13. The computer-implemented method according to claim 12, wherein the step of performing quantum rotations, proportional to estimated singular values of second matrix, comprises performing quantum rotations on Y axis of Bloch sphere, proportional to estimated singular values of second matrix.

14. The computer-implemented method according to claim 11, wherein the step of performing quantum rotations, proportional to estimated singular values of second matrix, comprises performing quantum rotations on Y axis of Bloch sphere, proportional to estimated singular values of second matrix.

* * * * *